US005500906A

United States Patent [19]
Picard et al.

[11] Patent Number: 5,500,906
[45] Date of Patent: Mar. 19, 1996

[54] LOCATING CURVILINEAR OBJECTS USING FEATHERED FIDUCIALS

[75] Inventors: Len L. Picard, Wilmington; Frederic Barber, Beverly, both of Mass.

[73] Assignee: Cognex Corporation, Natick, Mass.

[21] Appl. No.: 181,328

[22] Filed: Jan. 14, 1994

[51] Int. Cl.$^6$ .................................................. G06K 9/62
[52] U.S. Cl. ................................... 382/220; 382/291
[58] Field of Search ................................. 382/48, 30, 42, 382/8, 291, 209, 278, 151, 217, 218, 220; 348/87, 94, 95; 356/390, 400, 401, 247, 248

[56] References Cited

U.S. PATENT DOCUMENTS

| | | | |
|---|---|---|---|
| 4,643,579 | 2/1987 | Toriumi et al. | 348/95 |
| 4,648,053 | 3/1987 | Fridge | 382/8 |
| 4,757,550 | 7/1988 | Uga | 382/48 |
| 5,189,711 | 2/1993 | Weiss et al. | 382/8 |
| 5,204,911 | 4/1993 | Schwartz et al. | 382/8 |

OTHER PUBLICATIONS

Efrat et al. "Subpixel Image Registration Using Circular Fiducials" Proc. 2nd Israel Symp. Theory and Comput. Systems, Jun. 1993, pp. 49–58.

Computer Vision, by Ballard & Brown, publ. by Prentice--Hall, Inc. 1982, pp. 65–70.

*Primary Examiner*—Joseph Mancuso
*Assistant Examiner*—Jon Chang
*Attorney, Agent, or Firm*—Maureen Stretch

[57] ABSTRACT

A method and apparatus for locating curvilinear objects of variable scale in digitized images using feathered fiducials. The leathered fiducials are constructed by: defining a range of tolerated object size scale variations; generating an enlarged submodel within the range of tolerated scale variations and assigning background pixel values exterior to the enlarged submodel; generating a reduced size submodel within the range of tolerated scale variations and assigning foreground pixel values to the reduced size submodel; disposing the reduced size submodel within and tangent to the enlarged submodel at the application point; uniformly changing grey scale pixel values in a graduated manner from foreground to background between the reduced size submodel and the enlarged one. The curvilinear objects are then located by conducting searches using the constructed fiducials.

22 Claims, 9 Drawing Sheets

| 8 | 6 | 6 | 4 | 0 | 0 | 0 |
|---|---|---|---|---|---|---|
| 8 | 8 | 6 | 6 | 6 | 0 | 0 |
| 8 | 8 | 8 | 6 | 6 | 6 | 0 |
| 8 | 8 | 8 | 6 | 6 | 6 | 0 |

Reduced size model
160

Feathered area pixel values

Figure 5

Reduced size submodel 160

Enlarged size submodel 150

Figure 5a

| 0 | 127 | 191 |     | 240 | 255 |
|---|-----|-----|-----|-----|-----|
| 0 | 12  | 71  | 150 | 209 |     |
| 0 | 1   | 71  | 112 | 165 | 209 |
| 0 | 0   | 12  | 96  | 142 | 186 |
| 0 | 0   | 45  | 91  | 137 | 183 |

Figure 6

LOCATING CURVILINEAR OBJECTS USING FEATHERED FIDUCIALS

BACKGROUND OF THE INVENTION

1. Field of the Invention

This invention relates to machine vision, and more particularly, to methods and apparatus for accurately locating curvilinear patterns in a digitized image.

2. Background

Many production machines require automated alignment of objects such as printed circuit boards before processing operations can take place. In such applications, machine vision systems can be used to capture an image of the object to be aligned and analyze that image for a match to a pretrained "model" of a fiducial or locator target on the object. Typically, normalized correlation search techniques are used in such vision systems to perform the image analysis against the model. The vision system can thus measure the x,y coordinates of a fiducial located on the object which best matches the pretrained model, and send those results to the production machine equipment, to move the physical object for proper alignment.

Figure 2:
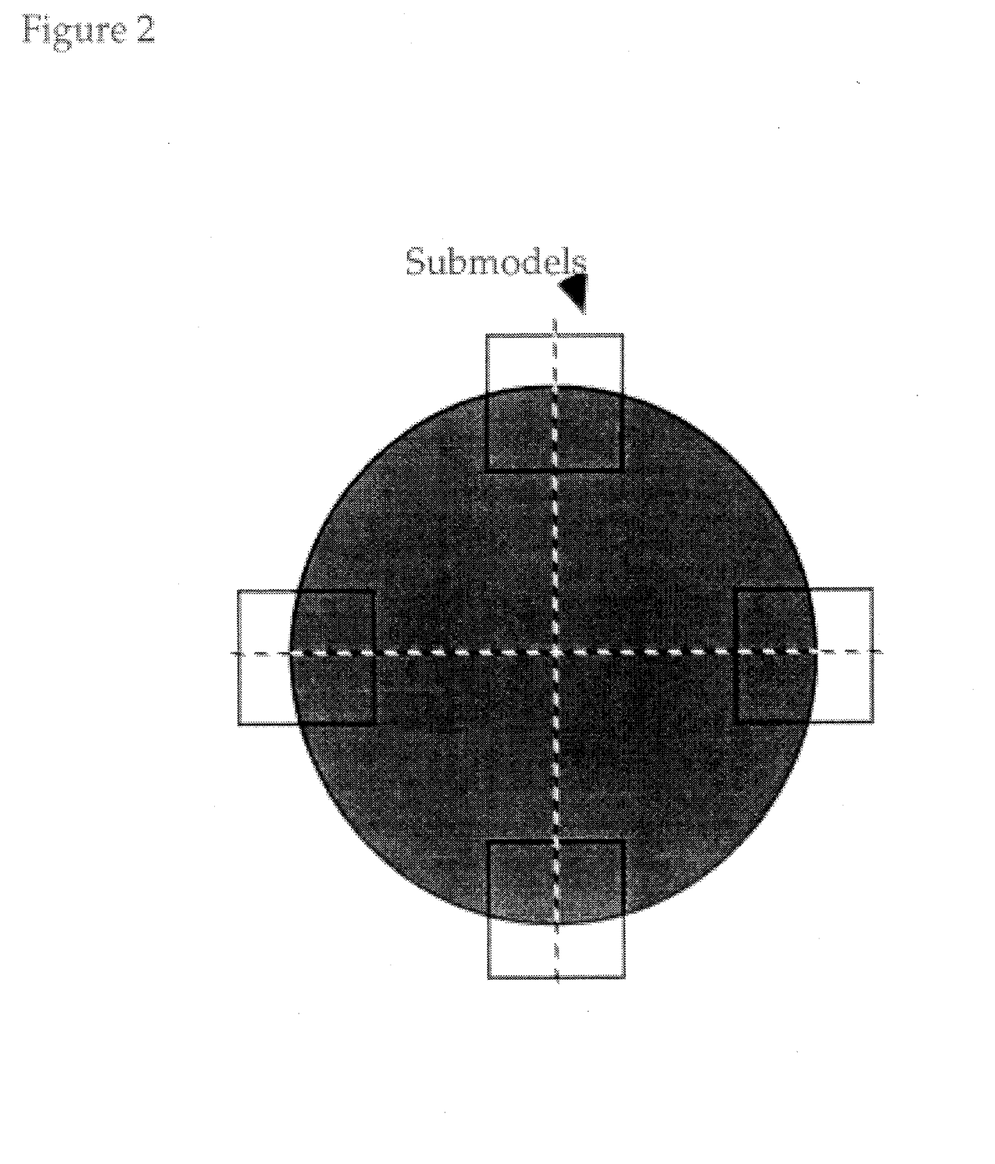
FIG. 2 depicts arc segments used in other techniques for creating subfeature models of circular objects.

Angular fiducial symbols, such as squares, rectangles, crosses and triangles, can be found using a number of techniques that are both fast and accurate. Circular or curvilinear fiducials can also be found using existing techniques, including the use of searching for subfeatures of the object, such as arc segments situated at intervals around the circumference, as illustrated in FIG. 2. Subfeature models are trained from a generated full resolution synthetic image or model of the fiducial.

One of the problems, however, with circular or other curvilinear fiducials is that they do not have the distinct, scale independent corner or angle features that angular fiducials have. When an actual rectangular fiducial changes in scale, its four corners still look the same.

When an actual circular or curvilinear fiducial changes in scale, its "corners" or arc segments change in shape. Since submodels for circular or curvilinear fiducials generated according to existing methods do not change in shape, this leads to problems in correctly locating the fiducial. If scale variation is significant, it may not be possible to locate the fiducial with existing techniques.

Scale factor changes are often caused by variations in the manufacturing process. The degree to which these variations can be tolerated determines the success of the fiducial location apparatus.

Figure 3:
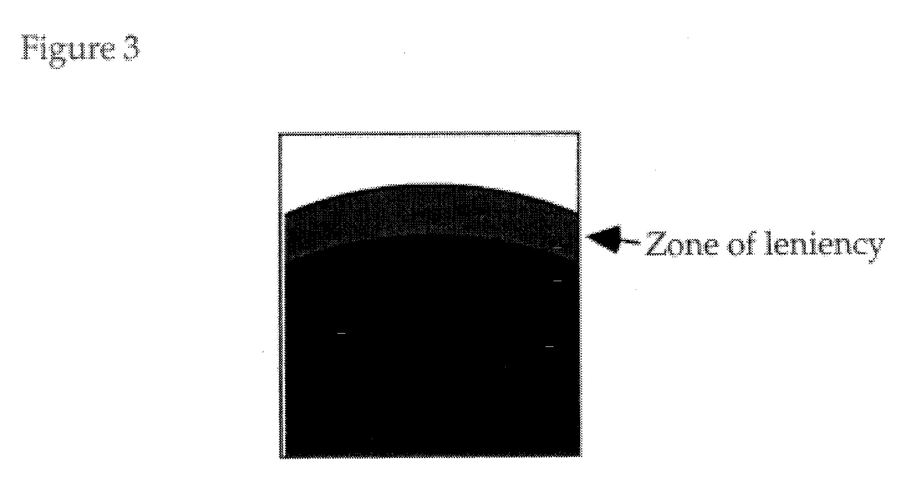
FIG. 3 depicts using a zone of leniency in a model used in other techniques for finding curvilinear objects.

One solution to problems of scale change involves designing a region of "leniency" around the edge of a subfeature model of the circular or curvilinear object. (FIG. 3). This area of leniency is usually represented to the machine vision system using pixel or pel values that correspond to a "don't care" zone around the outer edge of the submodel. Points found within this area may be considered matches. This solution sometimes provides better results in locating the object despite a change in scale, but it can also lead to inexactitude in the location of the object, thereby reducing accuracy and repeatability. In this approach, a search will find one of several good matches around the periphery of the curvilinear object for a particular submodel. As a result, while the leniency zone increases the chances that something will be found, the precise location of the fiducial or object may not be as accurately determined using this approach. This, in turn, can lead to inaccuracies in any alignment or positioning actions that are determined by the results of the search for the object.

SUMMARY OF THE INVENTION

The present invention provides a method and apparatus for locating curvilinear objects subject to variations in scale. The invention comprises defining a range of tolerated scale variations; generating an enlarged synthetic submodel within the range of tolerated scale variations and assigning background pixel values to the enlarged submodel; generating a reduced size synthetic submodel within the range of tolerated scale variations and assigning foreground pixel values to the reduced size synthetic submodel; disposing the reduced size submodel within the enlarged submodel so that the reduced model is tangent to the enlarged model at the application point; uniformly changing grey scale pixel values in a graduated manner from foreground to background between the reduced size submodel and the enlarged one; and conducting searches using submodels constructed according to the method and apparatus of the present invention.

It is an aspect of this invention that it minimizes the effect of scale variations on the accuracy of searches for curvilinear objects in digitized images. This is accomplished according to the method and apparatus of the present invention by feathering or varying the pixel values between a reduced size submodel having foreground pixel values, which is contained within and tangent to an enlarged size submodel having background pixel values, to create a "feathered" submodel.

It is another feature of this invention that it permits the user to specify a range of scale variations that can be tolerated. This can be specified and changed by the user of the machine vision system, based on either projected or actual experience with particular fiducials or objects.

It is an aspect of the invention that it creates submodels for use in conducting searches of digitized images of curvilinear objects that permit a correlation search to find a point in the digitized image that has a high correlation coefficient to the point at which two models contained within the submodel are tangent to each other, thus permitting faster and more accurate location of the object.

It is another feature of the present invention that any of a number of feathering algorithms or techniques can be used to accomplish a uniform, graduated change in grey scale between the reduced size submodel and the enlarged size submodel.

It is a feature of the present invention that it could be applied to one or more lobes of a curvilinear object.

DETAILED DESCRIPTION OF THE INVENTION

Figure 1:
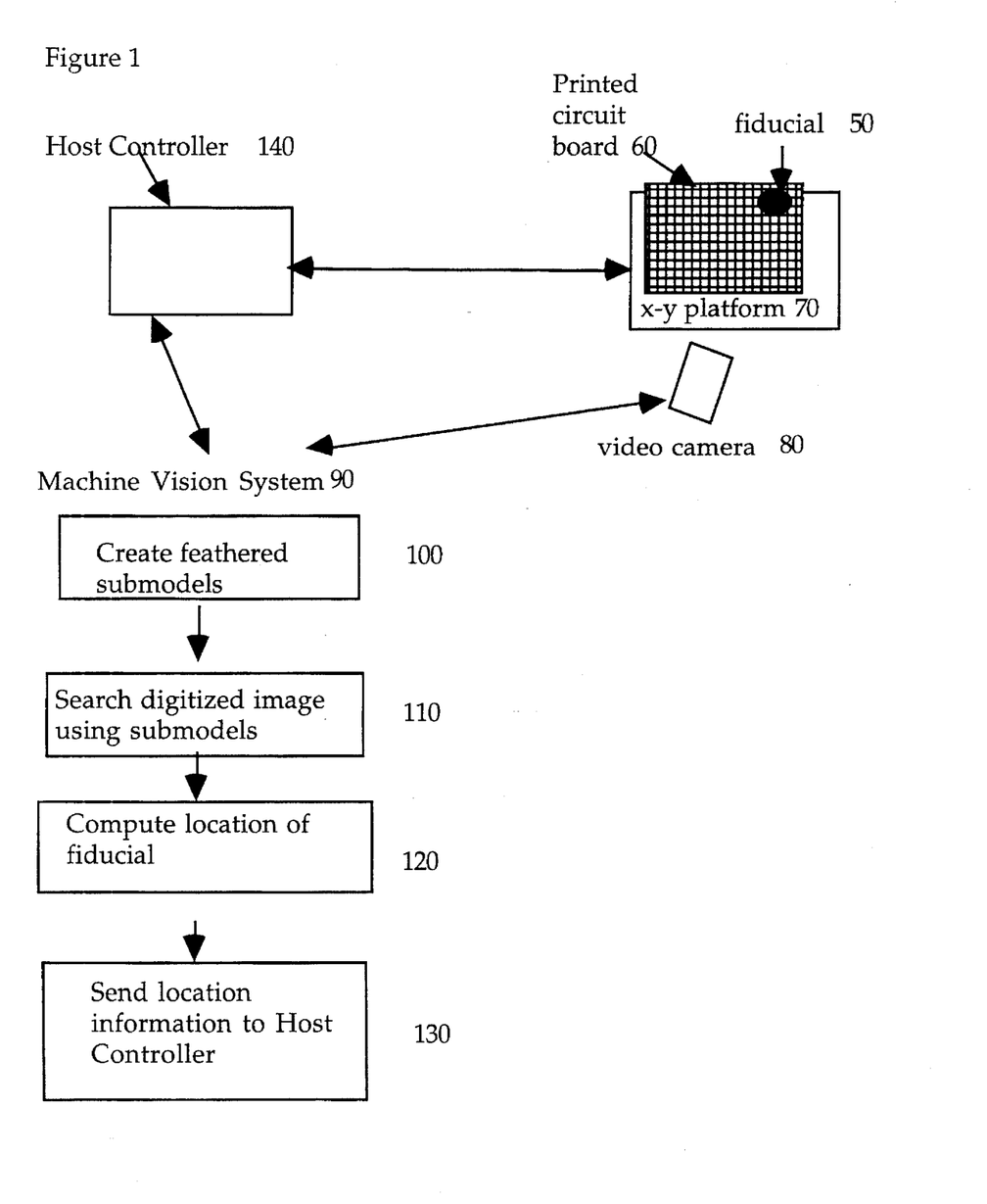
FIG. 1 is an illustrative drawing depicting the present invention embodied in a large production control system.

FIG. 1 illustrates the method and apparatus of the present invention. A printed circuit board 60, contains a circular fiducial 50. Printed circuit board 60 is placed on x,y platform 70 and video camera 80 is positioned to capture an image of printed circuit board 60. The image is sent to the machine vision system 90. In the machine vision system, the image is first digitized. Next, feathered submodels are created in step 100, and are used to search the digitized image in step 110. When points in the digitized image corresponding to the leathered submodels are located, the location of the fiducial is computed in step 120 and sent to the Host Controller 140, which will control the movement of x,y platform 70 to properly position printed circuit board 60.

Figure 4:
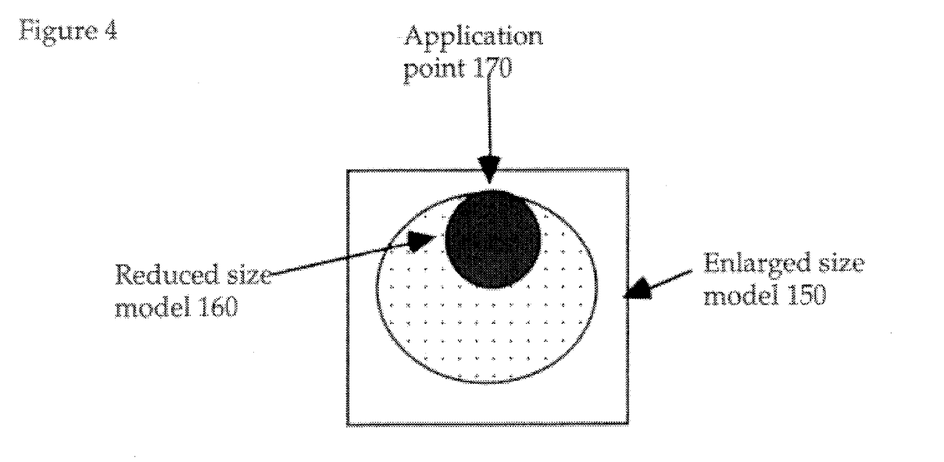
FIG. 4 depicts two submodels created according to the present invention, showing a range in scale from the reduced size submodel to the enlarged size submodel.

FIG. 4 shows the generation of a submodel larger than the expected size of the nominal fiducial, an enlarged size synthetic submodel 150, and a reduced size submodel 160 a submodel smaller than the expected size of the nominal fiducial, according to the present invention. According to a feature of the present invention, a reduced size submodel 160 is placed within and tangent to the enlarged size submodel 150 at the application point 170. To create four submodels, four application points 170 will be selected at intervals around the circumference.

Still in FIG. 4, it can be seen that foreground pixel values have been assigned to the reduced size submodel 160 and background values have been assigned exterior to the enlarged size submodel 150. The present invention next assigns uniformly changing grey scale pixel values in a graduated manner from foreground to background between the reduced size submodel 160 and the enlarged size submodel 150, to create the feathered area 200 shown in FIG. 4b.

Figure 4A:
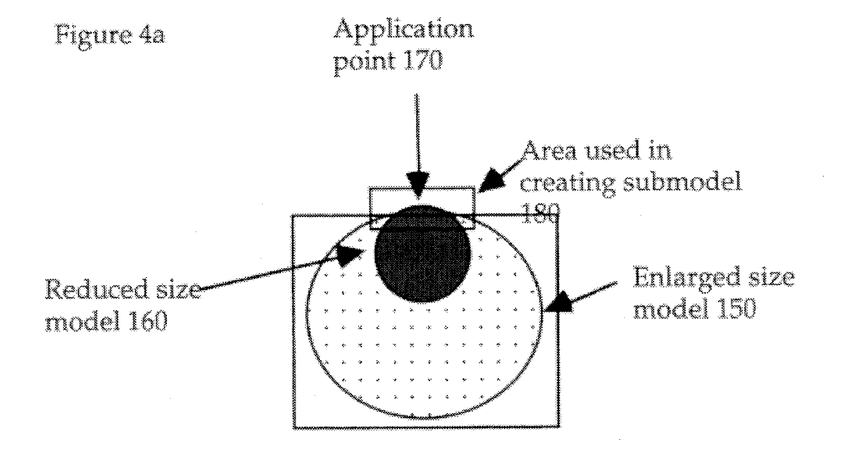
FIG. 4a depicts the positioning of the enlarged and reduced size submodels, according to the method and apparatus of the present invention.
Figure 4B:
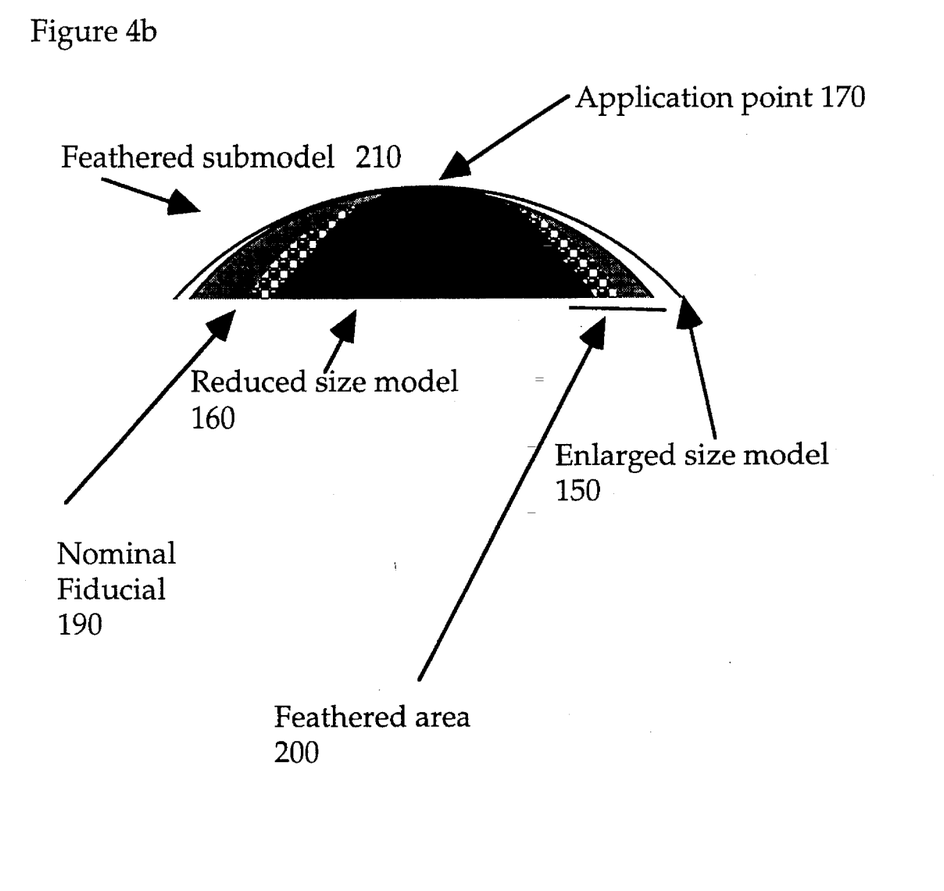
FIG. 4b depicts a feathered fiducial submodel created according to the method and apparatus of the present invention.

In a preferred embodiment of the present invention, a nominal fiducial 190, shown in FIG. 4b, by the line of dots, is specified by the user. Returning to FIG. 4a, this nominal fiducial is used to compute the application point 170 of the two tangent circles 180 which will serve as the area for the completed feathered submodel.

Correlation searches can then be conducted using submodels constructed according to the method and apparatus of the present invention.

Returning to FIG. 4, it can be seen that disposing a reduced size submodel 160, within an enlarged size submodel 150, so that the submodels are tangent, produces an area around the application point 170 which is appropriate for using as an arc segment submodel or "corner" feature. The size of the two submodels can be determined from the range of scale variation the user deems permissible. The range in permissible scale variation can be specified as a parameter or set of parameters to the machine vision system shown in FIG. 1.

Figure 6:
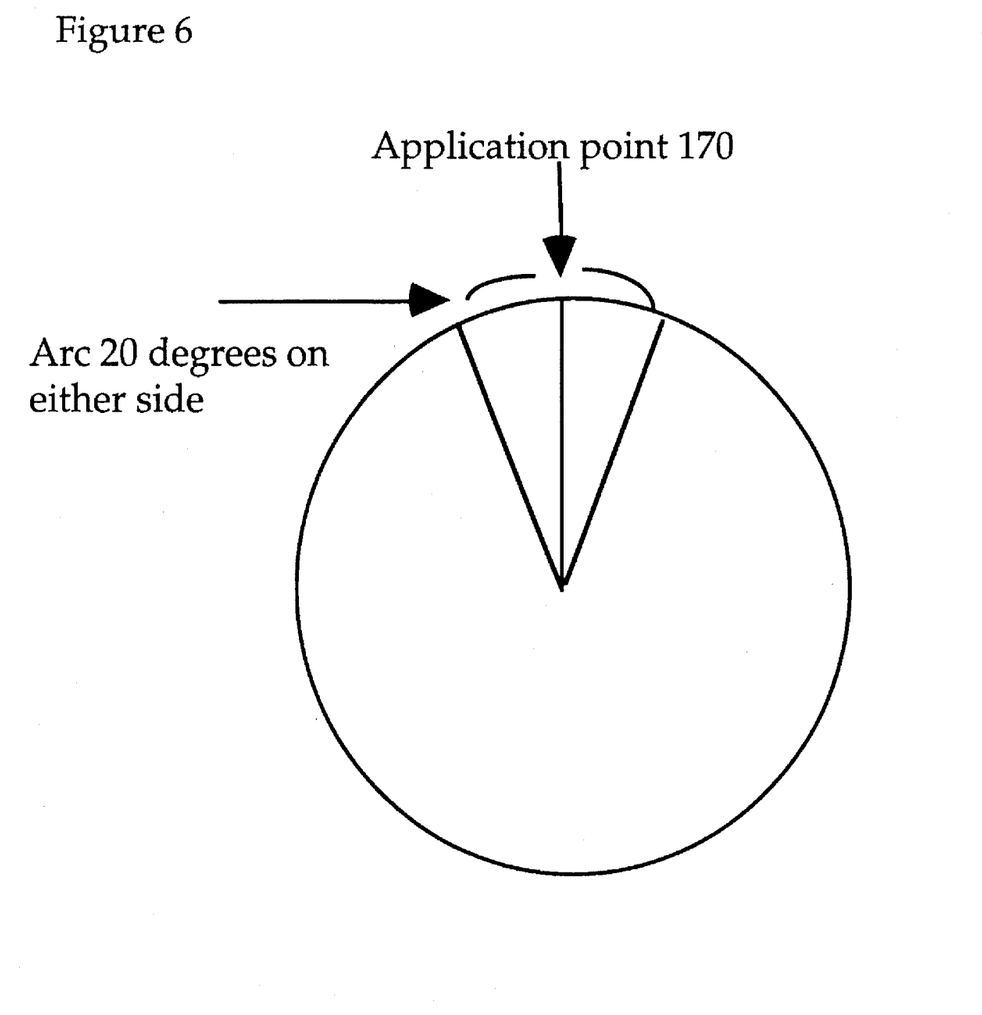
FIG. 6 shows one means of selecting an arc to encompass a feathered submodel, using the present invention.

In a preferred embodiment, the range can be defined as a percentage of increase or decrease in size of the nominal fiducial 190 depicted in FIG. 4b. In an alternative preferred embodiment, the range can be calculated from images of actual objects which vary in size. In a preferred embodiment, an arc of an arbitrarily selected number of degrees on either side of the application point 170 is used to determine the size of the feathered submodel. This is shown in FIG. 6. A number of techniques known to those skilled in the art can be used to convey the range and its limits, as well as the size of the feathered submodel arc to the machine vision system.

FIG. 4b shows a feathered submodel 210 generated within such a range, having gradations of grey. The reduced size submodel 160 is depicted inside and tangent to the enlarged size submodel 150. Reduced size submodel 160 is filled with foreground value pixels or pels which are also known as submodel ink pels, and the exterior of the most enlarged circle 150, is filled with background pels. In the illustration in FIG. 4b, foreground pels are depicted as black and background pels as white, but other values could be assigned to foreground and background. As long as a scheme is used to represent the pel values of foreground and background in such a way as to permit a gradation or graduation of pel values between the two, different pel value assignments can be used to depict various lighting and object contrast schemes.

When a feathered submodel 210 shown in FIG. 4b, is used for a correlation search, the point where all the circles meet or are tangent, application point 170, should produce the best correlation result for the edge of the fiducial and the "feathering" or graduated grey scale area will allow different sized fiducials to provide good matches or correlation scores at that point. Correlation search functions in machine vision systems known to those skilled in the art permit the use of submodels and return a correlation coefficient that indicates how closely the found image matches the submodel or model. Using a feathered submodel created according to the present invention, the correlation coefficients will be highest for the point where the reduced and enlarged submodels are tangent, application point 170 in FIG. 4b. This feathered submodel will report the same position independent of the actual fiducial size, assuming the fiducial is within the range designed into the feathered submodel and correlation or template match search techniques are used.

Figure 4C:
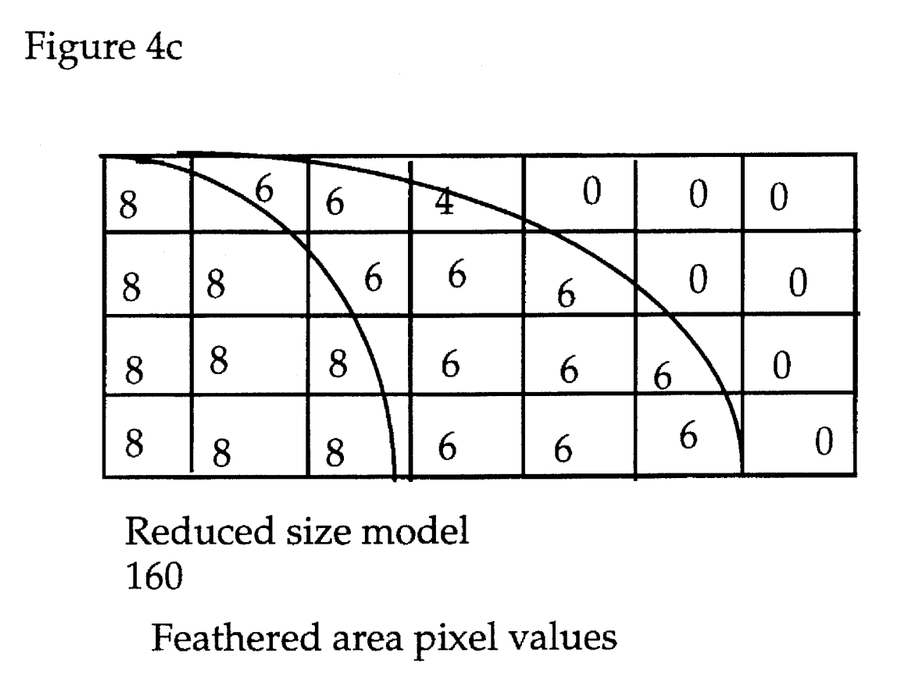
FIG. 4c depicts another method of creating a fill according to the method and apparatus of the present invention.
Figure 4D:
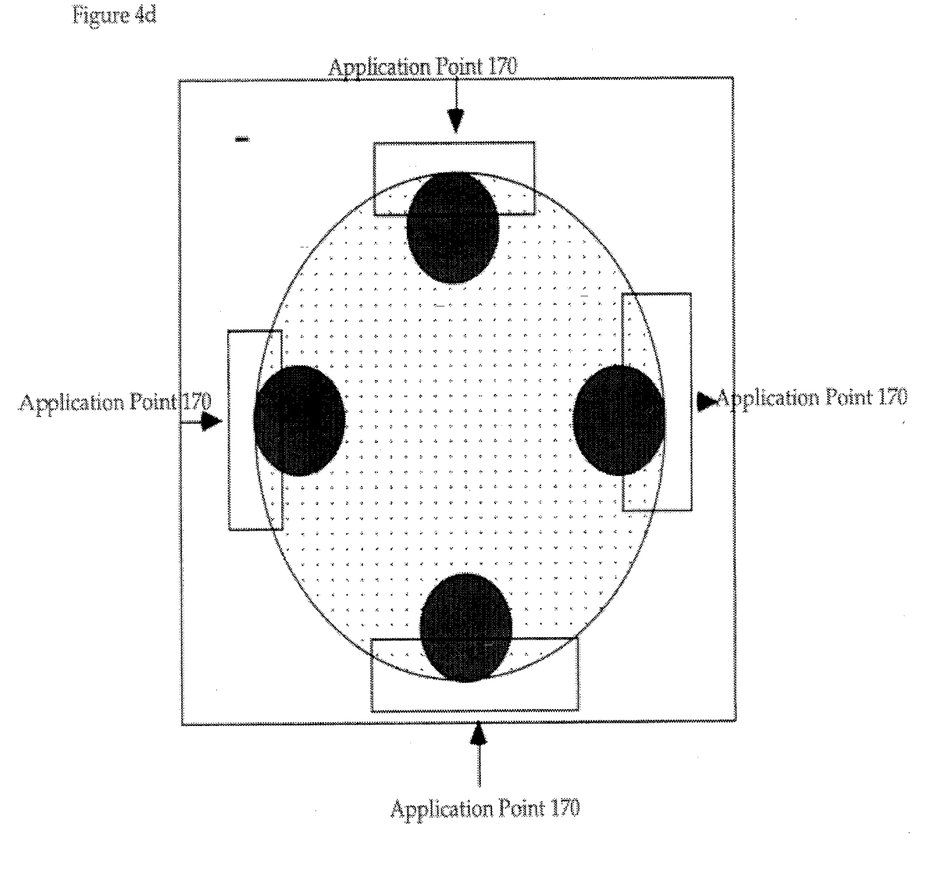
FIG. 4d shows the areas selected to create four feathered submodels for a circular object.

In a preferred embodiment, four different submodels are created for circular or elliptical objects. Each submodel is different because the point at which the reduced size submodel and the enlarged submodel are tangent, the application points 170, will be different for each of the "corners" or equidistant points on the circumference of a circular or elliptical object, as shown in FIG. 4d. Similarly, the pel or pixel value gradations will also reflect this change. In a preferred embodiment of the present invention only the portion of the "full" image that will actually be trained as a submodel is generated. In a preferred embodiment this is usually an area that is within some specified number of degrees around the application point, as shown in FIG. 6. Turning again to FIG. 4b a line of round dots depicts a nominal fiducial 190 contained within the feathered submodel 210. The user of the machine vision system can specify the values for this nominal fiducial 190, and the percentage of increase or decrease around it, as one way to specify the range of scale variations. However, it is a feature of the present invention that submodels can also be created from images of actual curvilinear fiducials, and the range of scale variations specified in some other way by the user.

Still in FIG. 4b, it can be seen that using a correlation search with multiple results requested, the point with the highest correlation found should correspond to application point 170 in the feathered submodel 210. The other points in the digitized image found near an application point 170 should also have good correlation to the points inside the submodel's feathered area. If this is not the case, then the object has not been found.

Once points corresponding to all submodels have been found, a preferred embodiment of the present invention locates the actual fiducial in the image. For circular or elliptical fiducials, or fiducials having point symmetry, the invention calculates the center by averaging those x,y coordinate positions in the found image which correspond to the application points in the submodels. Other objects having curvilinear features can be found using the method and apparatus of the present invention, by substituting calculations appropriate to the geometry of the particular curvilinear object. A gear having curved teeth disposed about its outer periphery could be searched for using the present method and apparatus. As long as the effects of scaling at the submodel points is well defined and uniform, the gear could be found in a digitized image using the method and apparatus of the present invention and substituting location calculation steps appropriate to the geometry of the gear's teeth.

A number of techniques can be used to generate the feathering or variation of the grey level between the two submodels. In a preferred embodiment of the invention, the grey scale is calculated for each pixel between the reduced and enlarged size submodels which will be included in the feathered submodel. The grey scale gradation could also be assigned on a fixed, pre-determined basis. For example, a predetermined gradation of pixel values ranging from 16 to 8 to 4 to 2 to 0 could be used to represent the gradation, where 16 is the foreground value and 0 the background. An arbitrary arrangement similar to this is illustrated in FIG. 4c.

In a preferred embodiment of the invention, the feathering algorithm changes grey levels smoothly from the background grey level to the foreground or submodel ink grey level and the grey level is calculated for each point or pixel between the two submodels that is to be included in the feathered submodel.

In a preferred embodiment of the present invention the feathering algorithm creates a uniform radial change in grey level.

Figure 5:
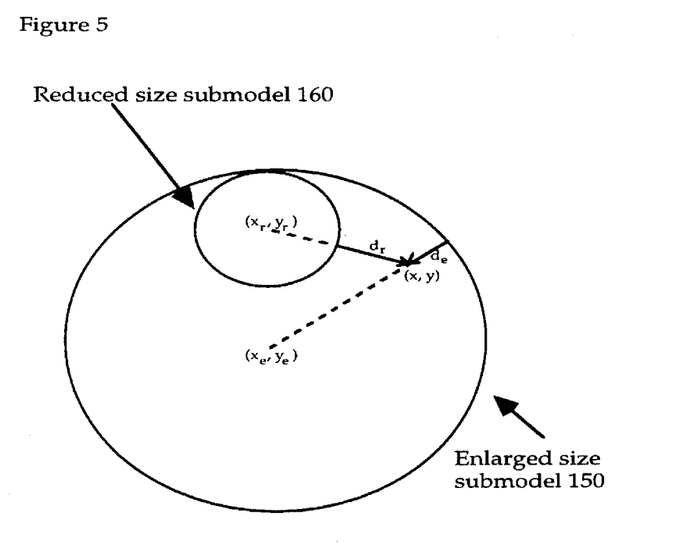
FIG. 5 shows a method and apparatus used to generate grey scale fill in a preferred embodiment of the present invention.
Figure 5A:
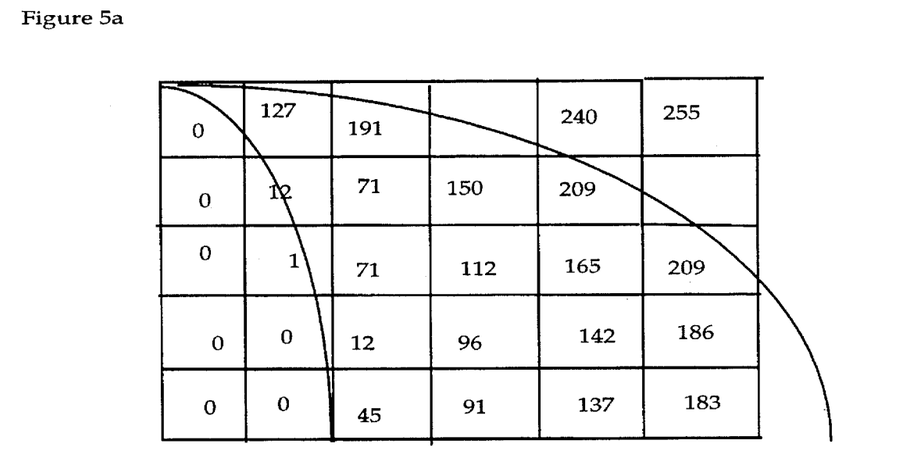
FIG. 5a illustrates pixel values that might be generated for a portion of a submodel using the present invention.

As shown in FIG. 5, to process each pixel and assign it a grey value, the present invention calculates the distance along a radial line from the edge of the inner or reduced size submodel 160 (dr) to the point, p, in the portion of the selected area being processed and the distance along a radial line from the edge of the outer circle to the point in the portion of the selected area being processed (de).

The grey level of the pel being processed is initially given the foreground grey level, to which is added the difference between the foreground and background levels, scaled with the following factor:

$$\frac{dr}{dr + de}$$

As the point approaches the reduced submodel, dr approaches zero and the grey level is set to the foreground level. As the point approaches the enlarged circle, de approaches zero, the ratio approaches one, and the grey level is set to the background level. The complete formula is illustrated below:

$$fg + (bg - fg) \frac{d_r}{d_r + d_e}$$

Those skilled in the art will appreciate that the embodiments described above are illustrative only and that other systems in the spirit of the teachings herein fall within the scope of the invention. Thus, for example, it will be appreciated that methods and apparatus other than that described above for grey scale fill generation can be used.

Likewise, the use of feathering or grey scale fill algorithms other than those described above fall within the spirit and scope of the invention. Moreover, it will be appreciated that the method and apparatus described herein can be used to identify curvilinear patterns other than circles or ellipses or toothed gears.

Similarly, systems constructed in accord with the invention have applicability outside the field of machine production of printed circuit boards. Thus, for example and not limitation, they can be used to locate curvilinear objects in printed materials, and in positioning parts for assembly or inspection.

These and other such uses, as well as modifications, additions and deletions to the techniques described herein may fall within the scope of the invention.

What is claimed is:

1. A method for locating a curvilinear object in a digitized image, comprising:

a) defining a range of scale variations;

b) generating an enlarged submodel having dimensions larger than those expected for said curvilinear object within said range of scale variations;

c) generating a reduced size submodel of said curvilinear object having dimensions smaller than those expected for said curvilinear object and within said range of scale variations;

d) disposing said reduced size submodel within said enlarged submodel and tangent to said enlarged submodel;

e) generating a feathered submodel by varying pixel grey scale values between said enlarged and said reduced size submodels;

f) conducting a correlation search of said digitized image of said curvilinear object using said feathered submodel, whereby the point in said digitized image reported by said correlation search as having the highest correlation to said feathered submodel is deemed to be at an edge of said curvilinear object and used to compute a center of said curvilinear object to locate it.

2. The method of claim 1 wherein generating a feathered submodel further comprises computing a fill area between said enlarged submodel and said reduced size submodel.

3. The method of claim 2, wherein defining the range of scale variations further comprises:

a) specifying a nominal submodel size;

b) specifying a percentage of acceptable size variations larger and smaller than said nominal submodel size.

4. The method of claim 2, wherein generating a feathered submodel further comprises creating a smoothly varying grey scale fill in said fill area.

5. The method of claim 2, further comprising creating a radial grey scale fill in said fill area by varying pixel intensity gradually along a radius.

6. The method of claim 2 further comprising:
a) calculating the distance(dr) along a line from an edge of said reduced size submodel to a point being processed in said fill area;
b) calculating the distance(de) along a line from an edge of said enlarged submodel to said point being processed;
c) setting the value of the pixel for said point being processed to a foreground pixel value, fg, scaled to a background pixel value, bg, using the following algorithm:

$$fg + (bg - fg)\frac{d_r}{d_r + d_e}.$$

7. The method of claim 3, wherein generating a feathered submodel further comprises creating a smoothly varying grey scale fill in said fill area.

8. The method of claim 3, further comprising creating a radial grey scale fill in said fill area by varying pixel intensity gradually along a radius.

9. The method of claim 3 further comprising:
a) calculating the distance(dr) along a line from an edge of said reduced size submodel to a point being processed in said fill area;
b) calculating the distance(de) along a line from an edge of said enlarged submodel to said point being processed;
c) setting the value of the pixel for said point being processed to a foreground pixel value, fg, scaled to a background pixel value, bg, using the following algorithm:

$$fg + (bg - fg)\frac{d_r}{d_r + d_e}.$$

10. A method for locating a curvilinear object in a digitized image, comprising:
a) defining a range of scale variations by specifying a nominal submodel size and a percentage of acceptable size variations larger and smaller than said nominal submodel size;
b) generating an enlarged submodel having dimensions larger than those expected for said curvilinear object within said range of scale variations;
c) generating a reduced size submodel of said curvilinear object having dimensions smaller than those expected for said curvilinear object and within said range of scale variations;
d) disposing said reduced size submodel within said enlarged submodel and tangent to said enlarged submodel;
e) computing a fill area between said enlarged submodel and said reduced size submodel;
f) generating a feathered submodel having varying pixel grey scale values between said enlarged and said reduced size submodels by creating a smoothly varying grey scale fill in said fill area;
g) conducting a correlation search of said digitized image using said feathered submodel, whereby the point in said digitized image reported by said correlation search as having the highest correlation to said feathered submodel is deemed to be at an edge of said curvilinear object and used to compute a center of said curvilinear object to locate it.

11. A method for locating a curvilinear object in a digitized image, comprising:
a) defining a range of scale variations;
b) generating an enlarged submodel having dimensions larger than those expected for said curvilinear object within said range of scale variations;
c) generating a reduced size submodel of said curvilinear object having dimensions smaller than those expected for said curvilinear object and within said range of scale variations;
d) disposing said reduced size submodel within said enlarged submodel and tangent to said enlarged submodel;
e) computing a fill area between said enlarged submodel and said reduced size submodel;
f) generating a feathered submodel having varying pixel grey scale values between said enlarged and said reduced size submodels by creating a smoothly varying grey scale fill in said fill area;
g) conducting a correlation search of a digitized image of said curvilinear object using said feathered submodel, whereby the point in said digitized image reported by said correlation search as having the highest correlation to said feathered submodel is deemed to be at an edge of said curvilinear object and used to compute a center of said curvilinear object to locate it.

12. An apparatus for locating a curvilinear object in a digitized image, comprising:
a) means for defining a range of scale variations;
b) means for generating an enlarged submodel having dimensions larger than those expected for said curvilinear object within said range of scale variations;
c) means for generating a reduced size submodel of said curvilinear object having dimensions smaller than those expected for said curvilinear object and within said range of scale variations;
d) means for disposing said reduced size submodel within said enlarged submodel and tangent to said enlarged submodel;
e) means for generating a feathered submodel by varying pixel grey scale values between said enlarged and said reduced size submodels;
f) means for conducting a correlation search of said digitized image of said object using said feathered submodel, whereby the point in said digitized image reported by said correlation search as having the highest correlation to said feathered submodel is deemed to be at an edge of said curvilinear object and used to compute a center of said curvilinear object to locate it.

13. The apparatus of claim 12 wherein said means for generating a feathered submodel further comprises means for computing a fill area between said enlarged submodel and said reduced size submodel.

14. The apparatus of claim 13, wherein said means for defining the range of scale variations further comprises:
a) means for specifying a nominal submodel size;
b) means for specifying a percentage of acceptable size variations larger and smaller than said nominal submodel size.

15. The apparatus of claim 13, wherein said means for generating a feathered submodel further comprises means for creating a smoothly varying grey scale fill in said fill area.

16. The apparatus of claim 13, further comprising means for creating a radial grey scale fill in said fill area by varying pixel intensity gradually along a radius.

17. The apparatus of claim 13 further comprising:
a) means for calculating the distance(dr) along a line from an edge of said reduced size submodel to a point being processed in said fill area;
b) means for calculating the distance(de) along a line from an edge of said enlarged submodel to said point being processed;
c) means for setting the value of the pixel for said point being processed to a foreground pixel value, fg, scaled to a background pixel value, bg, using the following algorithm:

$$fg + (bg - fg)\frac{d_r}{d_r + d_e}.$$

18. The apparatus of claim 14, wherein said means for generating a feathered submodel further comprises means for creating a smoothly varying grey scale fill in said fill area.

19. The apparatus of claim 14 further comprising means for creating a radial grey scale fill in said fill area by varying pixel intensity gradually along a radius.

20. The apparatus of claim 14 further comprising:
a) means for calculating the distance(dr) along a line from an edge of said reduced size submodel to a point being processed in said fill area;
b) means for calculating the distance(de) along a line from an edge of said enlarged submodel to said point being processed;
c) means for setting the value of the pixel for said point being processed to a foreground pixel value, fg, scaled to a background pixel value, bg, using the following algorithm:

$$fg + (bg - fg)\frac{d_r}{d_r + d_e}.$$

21. An apparatus for locating a curvilinear object in a digitized image, comprising:
a) means for defining a range of scale variations by specifying a nominal submodel size and a percentage of acceptable size variations larger and smaller than said nominal submodel size;
b) means for generating an enlarged submodel having dimensions larger than those expected for said curvilinear object within said range of scale variations;
c) means for generating a reduced size submodel of said curvilinear object having dimensions smaller than those expected for said curvilinear object and within said range of scale variations;
d) means for disposing said reduced size submodel within said enlarged submodel and tangent to said enlarged submodel;
e) means for computing a fill area between said enlarged submodel and said reduced size submodel;
f) means for generating a feathered submodel having varying pixel grey scale values between said enlarged and said reduced size submodels by creating a smoothly varying grey scale fill in said fill area;
g) means for conducting a correlation search of said digitized image of said object using said feathered submodel, whereby the point in said digitized image reported by said correlation search as having the highest correlation to said feathered submodel is deemed to be at an edge of said curvilinear object and used to compute a center of said curvilinear object to locate it.

22. An apparatus for locating a curvilinear object, comprising:
a) means for defining a range of scale variations;
b) means for generating an enlarged submodel having dimensions larger than those expected for said curvilinear object within said range of scale variations;
c) means for generating a reduced size submodel of said curvilinear object having dimensions smaller than those expected for said curvilinear object and within said range of scale variations;
d) means for disposing said reduced size submodel within said enlarged submodel and tangent to said enlarged submodel;
e) means for computing a fill area between said enlarged submodel and said reduced size submodel;
f) means for generating a feathered submodel having varying pixel grey scale values between said enlarged and said reduced size submodels by creating a smoothly varying grey scale fill in said fill area;
g) means for conducting a correlation search of a digitized image of said object using said feathered submodel, whereby the point in said digitized image reported by said correlation search as having the highest correlation to said feathered submodel is deemed to be at an edge of said curvilinear object and used to compute a center of said curvilinear object to locate it.

* * * * *